(No Model.) 2 Sheets—Sheet 1.
E. G. FISHER.
REGISTERING AND RECORDING SCALE BEAM AND WEIGHT.
No. 371,831. Patented Oct. 18, 1887.
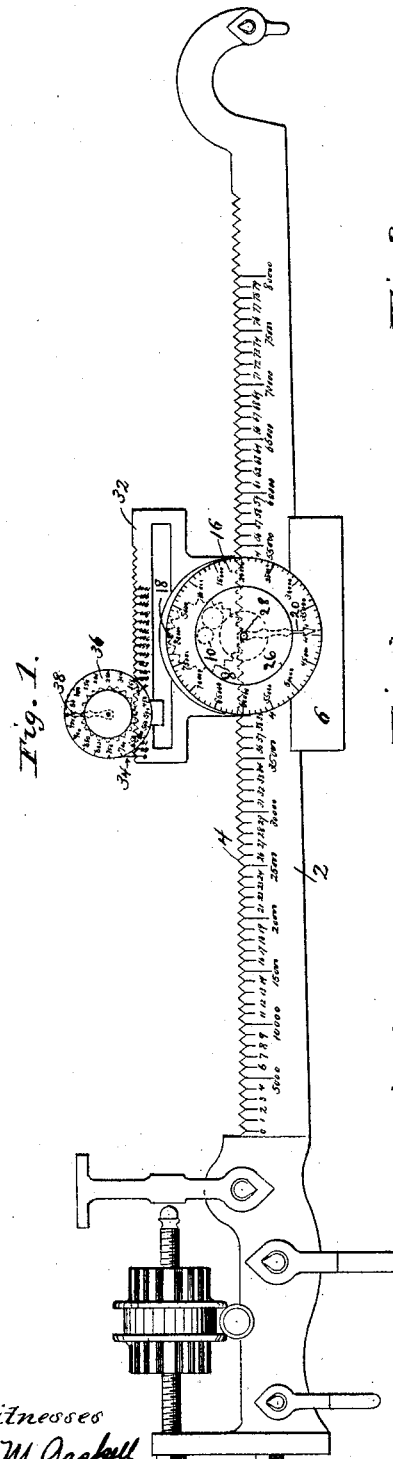
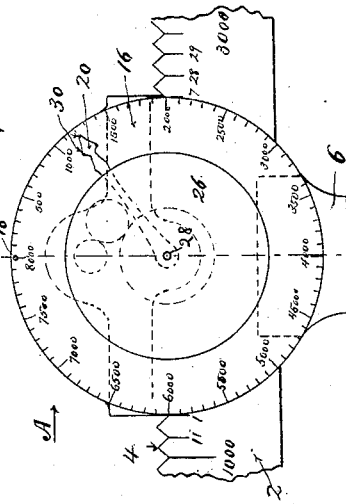
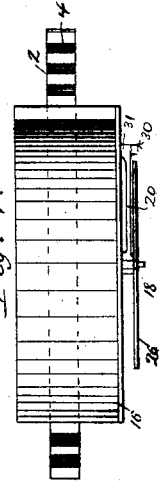
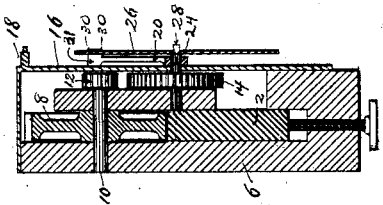
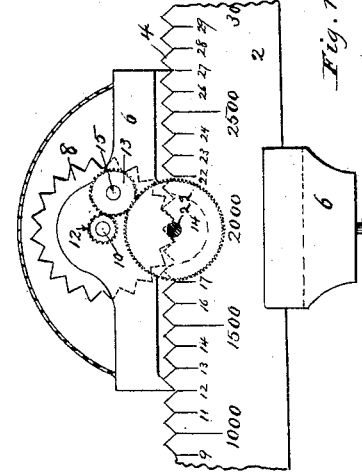
Witnesses
Inventor (No Model.) 2 Sheets—Sheet 2.

E. G. FISHER.
REGISTERING AND RECORDING SCALE BEAM AND WEIGHT.

No. 371,831. Patented Oct. 18, 1887.

Witnesses.
A. M. Gaskell
R. H. Sanford

Inventor
Edmund G. Fisher

UNITED STATES PATENT OFFICE.

EDMUND G. FISHER, OF MINNEAPOLIS, MINNESOTA.

REGISTERING AND RECORDING SCALE-BEAM AND WEIGHT.

SPECIFICATION forming part of Letters Patent No. 371,831, dated October 18, 1887.

Application filed December 22, 1886. Serial No. 222,251. (No model.)

*To all whom it may concern:*

Be it known that I, EDMUND G. FISHER, of Minneapolis, in the county of Hennepin and State of Minnesota, have invented a new and useful Registering and Recording Scale, of which the following is a specification.

The object of this invention is to provide a registering device which may be used in connection with a suitable scale to register the weight, and to provide means by which the reading of the registering device may be recorded upon a suitable ticket; also, to provide a ticket for use with said registering device, upon which the weight indicated by said registering device may be recorded in pounds or bushels, or both, or in other preferred units of weight.

Other objects of the invention will appear from the following detailed description.

Figure 5:
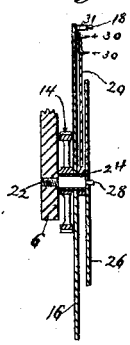
Figure 6:
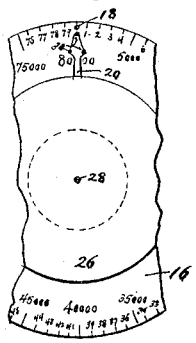
Figure 8:
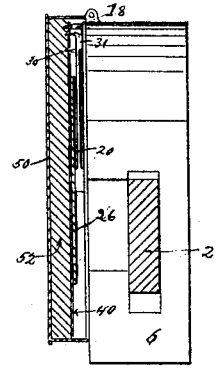
Figure 14:
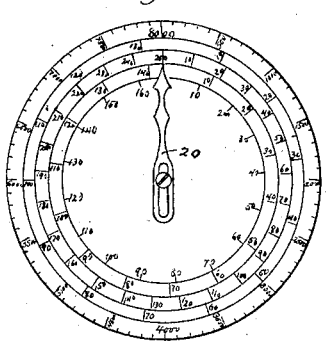

In the drawings, which form a part of this specification, Figure 1 is a side elevation of a scale-beam embodying my improvements. Fig. 2 is a side elevation, partly broken away, showing the invention applied to a scale-beam and single poise. Fig. 3 is a vertical section on line $x\ x$ of Fig. 2 looking in the direction indicated by arrow A. Fig. 4 is a plan view looking in the direction indicated by arrow B. Fig. 5 is a section of the dial, showing the manner of attaching the pointer. Fig. 6 is a partial face view of the same. Fig. 7 is a front elevation with the dial removed. Fig. 8 is an end elevation and partial section showing a cap for holding the ticket. Figs. 9, 10, 11, 12, and 13 are views of the ticket. Fig. 14 is a detail showing a modified dial. Fig. 15 shows the arrangement of gears for the movable dial and stationary pointer.

In the drawings, 2 represents a scale-beam of ordinary construction, having the weight-divisions marked thereon, its upper surface or edge being preferably provided with a rack, 4, the teeth of which may be cut upon the beam, or the rack may be independent and secured to the beam.

6 is a poise arranged to travel back and forth over the beam.

8 is a serrated wheel mounted upon an axle or shaft, 10. This wheel meshes with the rack 4, and the shaft supports the weight of the poise. The wheel 8 is of the proper diameter and furnished with the teeth necessary to make a certain number of complete revolutions in traveling from one end of the beam to the other. The one I have shown will make four of these complete revolutions.

12 is a pinion upon the outer end of the shaft 10. This pinion meshes with a pinion, 13, upon a short shaft, 15, and the pinion 13 in turn meshes with the gear 14 upon the pointer-shaft 24. This gear and pinion are of the proper relative proportions to give one revolution of the gear 14 while the poise is being moved from one extreme to the other of the beam. As shown, their proportion will be as one to four.

16 is a dial whose outer circumference is graduated or divided to correspond with the divisions upon the scale-beam. It will be seen by reference to Fig. 1 that the beam is divided to indicate eighty thousand pounds, and the dial indicates eighty thousand pounds. In Fig. 2, which is intended for use on a lighter scale, the dial indicates eight thousand pounds, in which case the beam would indicate the same number.

The dial is preferably provided with a pin, 18, placed centrally at its top. This pin is to furnish a means for accurately placing the ticket upon the dial so that its divisions will correspond with the divisions on the dial.

20 is a pointer attached to the shaft 24 and operated by the gear 14. The pointer-shaft is preferably constructed as shown in Fig. 5. A central stud, 22, is secured to a portion of the poise. A short hollow shaft, 24, revolves upon this stud. The shaft 24 passes through the dial, and the gear 14 and pointer 20 are attached thereto. To the outer end of the stud 22 the covering-plate 26 is secured. The plate 26 is made of sufficient diameter to protect the pointer, but not to interfere with the reading of the dial. The stud 22 is preferably provided with a point or projection, 28, which extends beyond the center of the plate 26, for the purpose of holding the ticket centrally in position upon the dial.

The pointer 20 is preferably provided with points 30, which project at right angles to and are located upon the three corners of the triangular head of said pointer, for the purpose of puncturing the ticket as it is pressed upon them. A re-enforcement, 31, may be made upon the back of the pointer opposite the points 30, which shall bear against the dial as the points are pressed through the paper and prevent bending the pointer. (See Fig. 5.)

32 is a small rack or beam mounted upon the poise 6 and carrying the auxiliary poise 34. This poise is also furnished with a dial, 36, and pointer 38, and is for the purpose of indicating the subdivisions on the scale-beam. The construction is similar to the one already described, except that as the distance traversed is short I am enabled to attach the pointer directly to the shaft of the operating-wheel, so that the wheel and pointer make one revolution in the extreme travel of the poise.

40 represents the ticket or tally-disk. I have shown in Fig. 9 a ticket suitable for use with the poise shown in Fig. 1. The outer circumference is divided to correspond with the dial 16, and an inner circle is divided to correspond with the dial 36.

Figure 9:
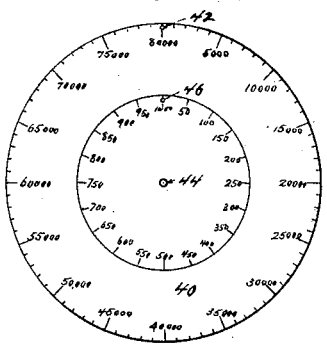
Figure 10:
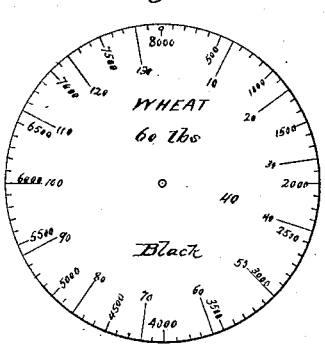
Figure 11:
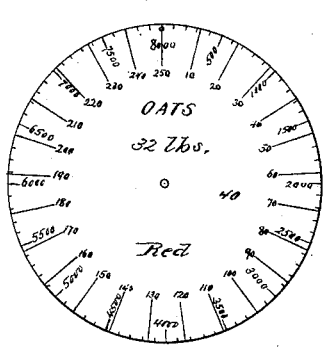
Figure 12:
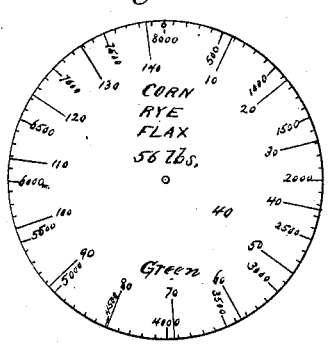
Figure 13:
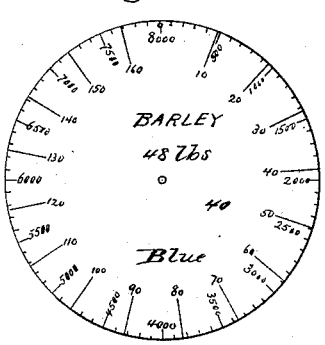

Holes 42 at the top and 44 in the center correspond with the pins 18 and 28, respectively. A hole, 46, may also be made at the upper edge of the inner division, as shown in Fig. 9, to fit over a corresponding pin upon the dial 36.

I prefer to provide a series of tickets and to divide each ticket into a number of divisions corresponding with the divisions of the scale-beam, and also to divide them into a number of divisions indicating the number of bushels and parts of bushels represented by the corresponding pound-divisions. The ticket to be used for wheat, Fig. 10, will be divided to indicate bushels of sixty pounds each. The ticket for oats, Fig. 11, will be divided to indicate bushels of thirty-two pounds each. The ticket for flax, corn, and rye, Fig. 12, will be divided to indicate bushels of fifty-six pounds each. The ticket for barley, Fig. 13, will be divided to indicate bushels of forty-eight pounds each. The several kinds of tickets may be printed or marked with ink of different colors—as, for example, the wheat-ticket may be marked with black ink; the oats-ticket with red ink; the flax, corn, and rye ticket with green ink, and the barley-ticket with blue ink. Each ticket thus having its distinguishing color, there need be no mistakes in using them.

When any grain or other substance is to be weighed, one of the tickets is placed over the dial, with its holes fitting upon the pins on the dial, after the poise has been removed to the proper point on the beam, so that the position of the pointer will indicate on the dial the weight on the scale, and punctures are made in it by pressing it against the points 30 on the end of the pointer. There will thus be formed a permanent record on the ticket, showing both the number of pounds and the number of bushels weighed.

Instead of being printed or marked with ink of different colors, the tickets may be provided with distinguishing-marks of any suitable character.

Two or more tickets can be used for each weighing, if preferred, and thus a duplicate record can be made. One ticket can be retained by the seller and the other by the buyer.

It will be seen that the dial furnishes a second reading which corresponds with the reading on the beam, and instead of marking the dial with figures corresponding with those on the beam it may be marked with letters or other characters. The dial may also be marked with several concentric scales, as shown in Fig. 14—one for indicating the weight in pounds, in the manner already described; another for indicating the number of bushels of sixty pounds each; another for indicating the number of bushels of fifty-six pounds each, and so on, and the reading may be made from the scale that indicates the number of bushels of the particular grain or other substance that is being weighed.

In Fig. 8 I have shown a cap, 50, that is hinged to the upper edge of the dial and provided with a lining of cork or other suitable material, 52. After one of the tickets 40 has been placed over the dial the cap is turned against it and presses the ticket against the pointer. The projections 30 on the pointer puncture the ticket and their ends are received by the soft lining of the cap. By this means the device can be used without injuring the pointer. It will be readily understood that as an equivalent construction the pointer may be stationary and the dial movable, and in Fig. 15 I have shown an arrangement of gears by which the movable dial may be operated. This arrangement is similar to the other, except that the intermediate gear, 13, is omitted and the pinion 12 meshes directly with the gear 14.

It is not essential that the spaces on the tickets correspond to those on the dials. For instance, the dial may be spaced and marked to indicate pounds, and the tickets that are used with it may be spaced and marked to indicate bushels. A ticket of this kind being placed over a dial indicating pounds, the weight will be reduced to bushels and fractions thereof, or to bushels and pounds, or, in other, words, the weight on the scale will be shown on the registering device in pounds, but will be recorded on the ticket in bushels.

I claim as my invention—

1. The combination, with a scale-beam and a sliding poise, of a registering mechanism upon the sliding poise, connecting means between said registering mechanism and said scale-beam, whereby said registering mechanism is operated automatically as the poise is moved over the beam and the weight is indicated by the registering mechanism, a ticket, and means for forming on said ticket a record of the weight indicated by the registering mechanism, substantially as described.

2. The combination, with a scale-beam, of a registering mechanism, a sliding poise, connecting means between said registering mechanism and the scale-beam, whereby said mechanism is operated automatically as the poise is moved over the scale-beam, and showing thereon the weight indicated by the position of the poise on the scale-beam, a spaced ticket, and means for forming on said ticket a record of the reading of the registering mechanism, substantially as described.

3. The combination, with a scale-beam and a sliding poise, of a dial secured upon the sliding poise, a wheel bearing upon the beam and adapted to be rotated as the poise is moved over the beam, and a pointer arranged to move over said dial and operated by said wheel, whereby the weight is indicated by the position of the poise on the beam and by the position of the pointer on the dial, a spaced ticket, and means for forming on the ticket a record of the position of the pointer, substantially as described.

4. The combination, with a scale-beam and a poise, of a dial secured to said poise and having divisions corresponding with the divisions of the scale-beam, a pointer pivoted upon said dial, and operating means, as described, for moving said pointer over said dial in unison with the movement of said poise over the scale-beam, a spaced ticket, and means for forming on the ticket a record of the position of the pointer on the dial, substantially as described.

5. The combination, with a scale-beam and a poise, of the dial secured upon said poise, the pointer on said dial provided with projections or points 30, means for operating said pointer as said poise is moved, and a spaced ticket adapted to fit over said dial and be punctured by the projections on said pointer, substantially as described.

6. The combination, with the scale-beam and poise, of the dial upon said poise having spaces corresponding with the spaces upon said beam, the pointer upon said dial, the ticket having spaces corresponding with the spaces on said dial, and means for puncturing said ticket to record the position of said pointer, substantially as described.

7. The weight-recording ticket having a circular scale with its divisions marked by one series of figures indicating pounds, and a second series of figures indicating bushels, in combination with a scale-beam and a registering mechanism, and means for forming on said ticket an impression showing the weight indicated by said registering mechanism, substantially as described.

8. The weight-recording ticket having a circular scale with its divisions marked by one series of figures indicating pounds, and a second series of figures indicating bushels, in combination with the scale-dial having a corresponding series of divisions, a pointer, means for moving said pointer over said dial, and means for forming punctures in said ticket to record the position of said pointer on said dial.

9. The weight-recording ticket having a series of concentric scales marked thereon, in combination with a weight-registering mechanism, and means for forming on said ticket a record of the reading of said registering mechanism, substantially as described.

10. The combination, with a registering mechanism having a spaced indicating-dial, of a spaced recording-ticket, and means for forming on said ticket a record of the reading of said dial, substantially as described.

11. The combination, with a scale-beam and sliding poise, of a registering mechanism upon the sliding poise provided with an indicating-dial, connecting means between said registering mechanism and the scale-beam, whereby said mechanism is operated automatically as the poise is moved over the scale-beam, whereby the weight is indicated on said dial, a ticket, and means for forming on said ticket a record of the weight indicated by said registering mechanism.

12. The combination, with a scale and sliding poise, of a registering mechanism upon the sliding poise provided with an indicating-dial, connecting means between said registering mechanism and the scale-beam, whereby said mechanism is operated automatically as the poise is moved over the scale-beam, whereby the weight is indicated on said dial, a spaced circular ticket, and means for forming on said ticket a record of the reading on said dial.

In testimony whereof I have hereunto set my hand this 18th day of December, 1886.

EDMUND G. FISHER.

In presence of—
A. C. PAUL,
A. M. GASKELL.